(12) United States Patent
Welch et al.

(10) Patent No.: US 6,510,217 B1
(45) Date of Patent: Jan. 21, 2003

(54) METHODS AND SYSTEMS FOR FORWARDING ANONYMOUS AND UNKNOWN CALLS

(75) Inventors: James Martin Welch, Wake Forest, NC (US); Aleeha Renee Travis, Wake Forest, NC (US); Janet LaCroix Catts, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/535,196

(22) Filed: Mar. 27, 2000

(51) Int. Cl.[7] .................. H04M 1/64; H04M 3/436; H04M 3/533; H04M 3/54
(52) U.S. Cl. .................. 379/211.02; 379/88.26; 379/142.04; 379/197
(58) Field of Search .................. 379/88.2, 88.25, 379/88.26, 93.02, 142.04, 142.06, 196, 197, 198, 199, 211.02

(56) References Cited

U.S. PATENT DOCUMENTS

| | | | | |
|---|---|---|---|---|
| 5,361,295 A | * | 11/1994 | Solomon et al. | 379/211.02 |
| 5,930,700 A | * | 7/1999 | Pepper et al. | 379/211.02 |
| 5,999,611 A | * | 12/1999 | Tatchell et al. | 379/197 |
| 6,041,114 A | * | 3/2000 | Chestnut | 379/211.02 |

* cited by examiner

Primary Examiner—Harry S. Hong
(74) Attorney, Agent, or Firm—Winthrop & Terranova, P.L.L.C.

(57) ABSTRACT

Methods and systems for forwarding anonymous and unknown calls include a call forwarder that receives call signaling messages from a calling party end office. The call forwarder determines whether a call identified by the call signaling message is anonymous or unknown. In response to determining that the call is anonymous or unknown, the call forwarder determines whether the calling party has an anonymous call forwarding feature. In response to determining that a calling party has an anonymous call forwarding feature, the call forwarder forwards the call to a predetermined destination.

38 Claims, 7 Drawing Sheets

METHODS AND SYSTEMS FOR FORWARDING ANONYMOUS AND UNKNOWN CALLS

TECHNICAL FIELD

The present invention relates to methods and systems for processing anonymous and unknown calls in a telecommunications network. More particularly, the present invention relates to methods and systems for forwarding anonymous and unknown calls to a predetermined destination, such as a voice mail system, without terminating the calls at the called party end office.

BACKGROUND ART

Telecommunications service providers currently allow subscribers to place anonymous calls, i.e., calls in which the calling party address cannot be displayed by the called party. In an SS7 network, an anonymous call is initiated by sending an initial address message (IAM) message with the calling party address field marked as private. Marking the calling party address as private prevents the called end user from using a caller identification feature to display the directory number from which the call originated. This is undesirable since the called end user may wish to identify and/or screen calls from undesirable sources, such as telemarketers.

An unknown call is a call that lacks any calling party information. An unknown call can occur when the call originates from a multifrequency (MF) analog trunk that does not provide automatic number identification (ANI). Since there is no calling party address information from an unknown call, the caller cannot be identified. Like anonymous calls, the called party cannot use a caller identification feature to identify and screen unknown calls.

One conventional solution to processing both anonymous and unknown calls is to play an announcement to the caller and release the call. For example, when an IAM message arrives at a called party end office and the calling party address is marked private, the called party end office performs a lookup in a line options database using the called party number to determine options for the called party. The conventional option for anonymous calls is rejection. Accordingly, the entry in the database for the called party number includes a parameter that instructs the end office to reject an anonymous call. This parameter is referred to as anonymous call rejection (ACRJ).

When a called party end office receives an anonymous call and determines that the called party has the ACRJ feature, the called party end office either plays an announcement to the calling party or instructs the calling party end office to play an announcement to the calling party. The announcement might be, "the party whom you have called does not accept calls from anonymous sources. If you desire to contact this party, please unblock your number and call again." Following the announcement the called party end office sends a release message to the calling party end office to disconnect the call. Thus, the calling party is required to unblock his or her directory number and attempt to reestablish the call.

Requiring an anonymous caller to hang up and reestablish a call is undesirable because it places an unnecessary burden on the caller. For example, if the calling party and the called party are not in the same local service area, the calling party must make two long distance telephone calls in order to contact the called party. The calling party must first attempt to establish the call anonymously and receive the rejection. The calling party must then contact his or her local end office, usually using a predetermined dialed feature code, and unblock his or her number. Once the calling party unblocks his or her number, the calling party must redial the number for the called party.

If the calling party is someone with whom the called party desires to communicate, it might not be desirable to require the calling party to unblock his or her number and make an additional telephone call. However, this is the only alternative in a conventional telecommunications network because anonymous calls can either be accepted or rejected, i.e. released. As a result, there exists a need for novel methods and systems for processing anonymous and unknown calls that provide increased call processing flexibility.

DISCLOSURE OF THE INVENTION

A method for processing anonymous and unknown calls includes receiving a call signaling message for establishing a call with a calling party at a called party end office switch. The switch determines whether the call is anonymous or unknown based on the call signaling message. In response to determining that the call is anonymous or unknown, the switch forwards the call to a predetermined destination directory number.

A system for receiving anonymous and unknown calls includes a receiver for receiving call signaling messages. A call forwarder parses the call signaling messages and determines whether the messages originate from an anonymous or an unknown caller. If the call forwarder determines that a call originates from an anonymous or unknown source, the call forwarder accesses a line options database to determine whether an anonymous call forwarding feature is active. In response to determining that the anonymous call forwarding feature is active, the call forwarder forwards the call to a predetermined destination.

Accordingly, it is an object of the invention to provide novel methods and systems for processing anonymous and unknown calls.

An object of the invention having been stated hereinabove and which is achieved in whole or in part by the present invention, other objects will be evident as the description proceeds, when taken in connection with the accompanying drawings as best described hereinbelow.

BRIEF DESCRIPTION OF THE DRAWINGS

A description of preferred embodiments of the present invention will now proceed with reference to the accompanying drawings of which.

DETAILED DESCRIPTION OF THE INVENTION

Figure 1:
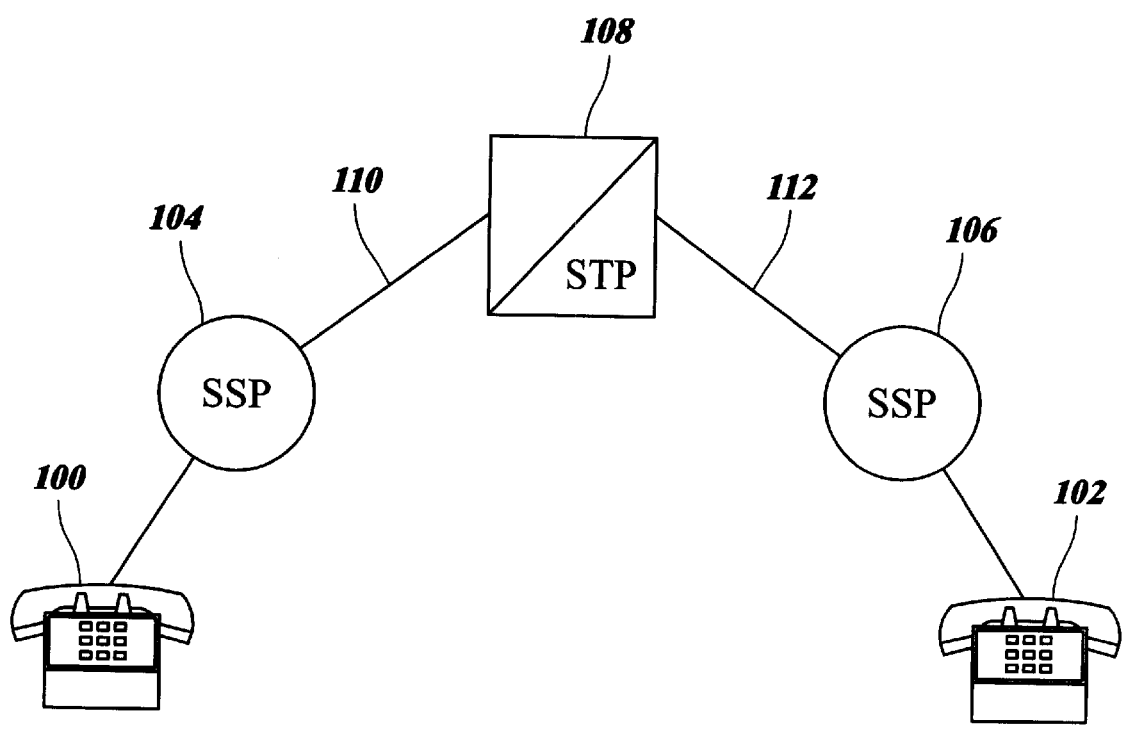
FIG. 1 is a block diagram of a conventional telecommunications network.

FIG. 1 illustrates a conventional telecommunications network. In FIG. 1 a calling party 100 attempts to establish a call with a called party 102. Calling party 100 is connected to calling party end office 104. Calling party end office 104 can comprise a service switching point (SSP). Called party 102 is connected to called party end office 106, which also comprises an SSP. Calling party end office 104 and called party end office 106 are connected to signal transfer point (STP) 108 via SS7 signaling links 110 and 112.

Figure 2:
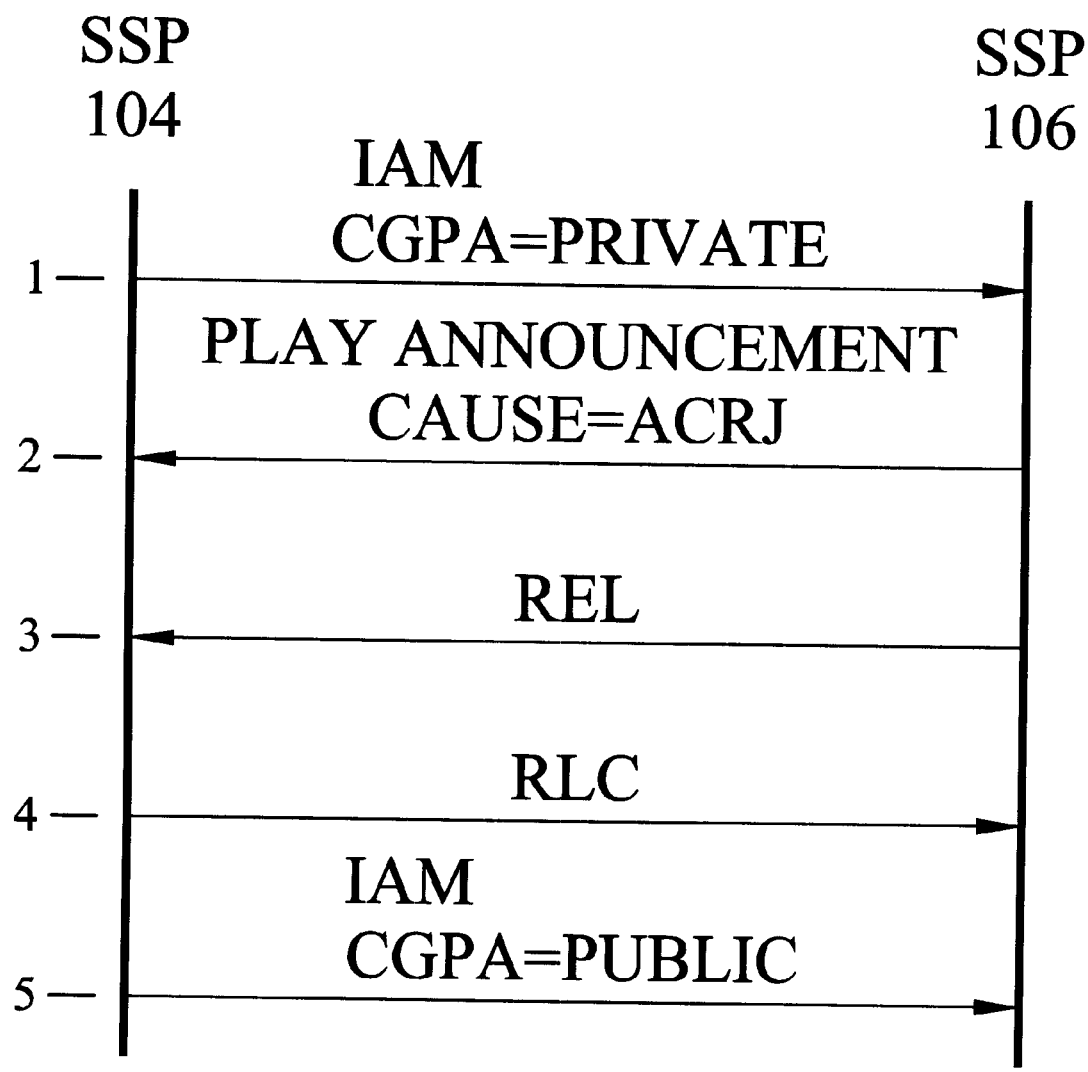
FIG. 2 is a call flow diagram illustrating conventional call signaling for anonymous call rejection.

FIG. 2 is a call flow diagram illustrating exemplary call signaling between calling party end office 104 and called party end office 106 for processing an anonymous call. In line 1 of the call flow diagram, SSP 104 sends an initial address message (IAM) message to SSP 106. The IAM message contains a calling party address field marked as private. SSP 106 performs a lookup in its line options database using the called party number received in the IAM message. SSP 106 locates the entry corresponding to the called party number and determines the line options corresponding to that entry. In this example, it is assumed that the option for anonymous calls is anonymous call rejection (ACRJ). Accordingly, in line 2 of the call flow diagram, SSP 106 sends a PLAY ANNOUNCMENT message to SSP 104 with the cause equal to ACRJ. In response to receiving the PLAY ANNOUNCEMENT message, SSP 104 plays an appropriate announcement to the calling party. In line 3 of the call flow diagram, SSP 106 sends a release (REL) message to SSP 104. The REL message indicates that the called party end office has released the call.

The only way for the calling party to reestablish communications with the called party is to hang up and redial the called party directory number. Accordingly, in line 4 of the call flow diagram, when the calling party goes on-hook, the calling party sends a release complete (RLC) message to SSP 106. The calling party must then unblock his or her number by sending an appropriate code to the calling party end office. Once the calling party disables the anonymous calling feature, the calling party must then redial the called party number. In line 5 of the call flow diagram, this redialing results in an IAM message with the called party address field marked as public being sent to SSP 106. SSP 106 can then proceed to establish the call with the called party because the call is no longer anonymous. Thus, in conventional anonymous call processing, the only option for an anonymous calling party is to hang up, unblock his or her number, and attempt to reestablish the call. This is inconvenient for the calling party and results in unnecessary call signaling traffic.

Figure 3:
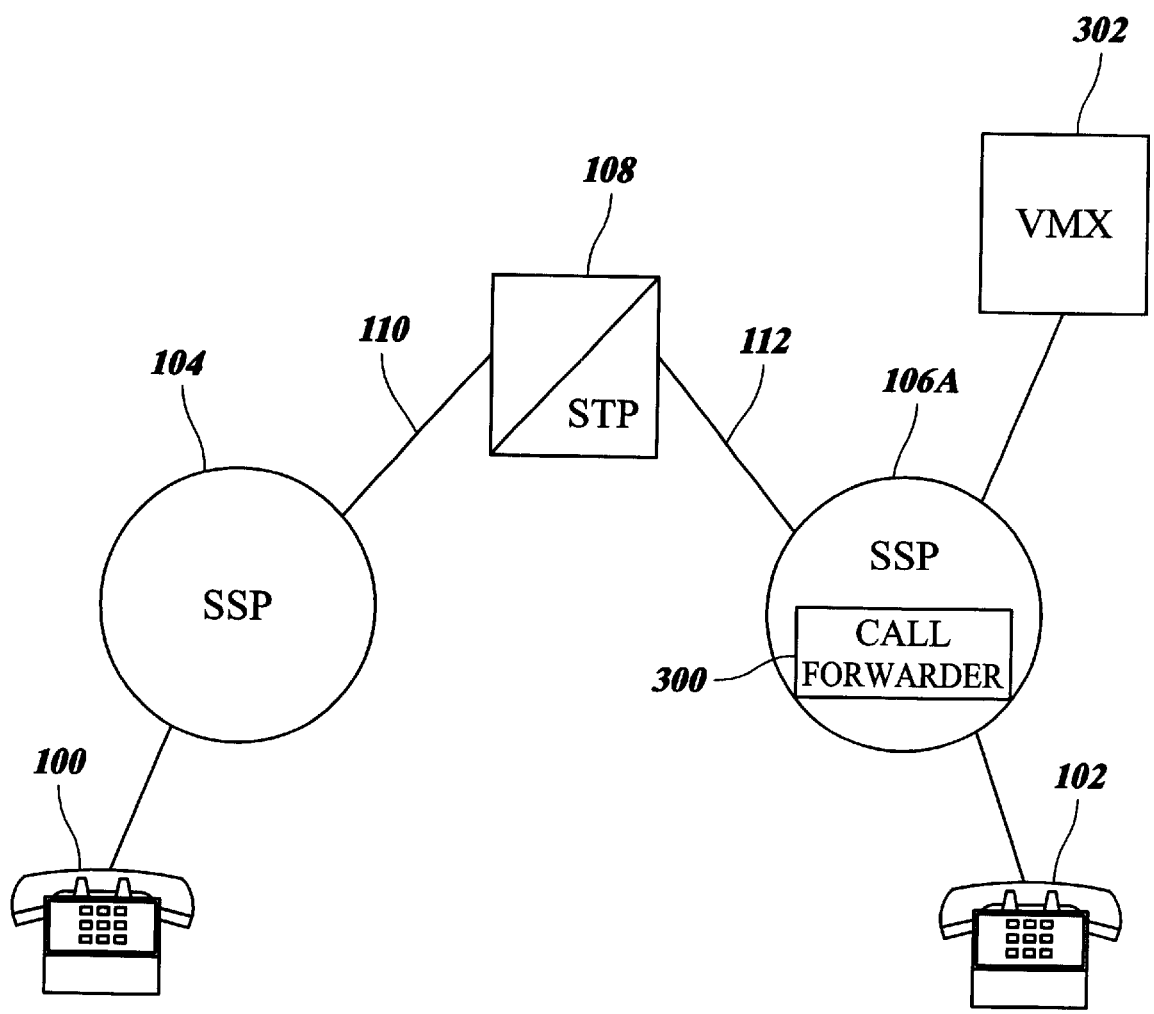
FIG. 3 is a block diagram of a telecommunications network including a system for processing anonymous and unknown calls according to an embodiment of the present invention.

FIG. 3 illustrates a system for processing anonymous and unknown calls according to an embodiment of the present invention. In FIG. 3, calling party 100 is assumed to be an anonymous caller desiring to establish a call with called party 102. SSP 104 and STP 108 perform conventional call signaling functions as described with respect to FIG. 2. However, SSP 106A includes call forwarder 300 for processing anonymous and unknown calls. For example, rather than terminating unknown calls and instructing SSP 104 to play an announcement, call forwarder 300 can forward anonymous and unknown calls to voice mail system 302. An exemplary voice mail system suitable for use with the present invention is a Glenayre™ voice mail system. Voice mail system 302 can include an interface for communication with SSP 106A. For example, the interface can be a simplified message desk interface (SMDI) or an SS7 interface. An exemplary end office switch suitable for use as SSP 106A is the DMS family of switches available from Nortel Networks, Inc. of Research Triangle Park, North Carolina.

Figure 4:
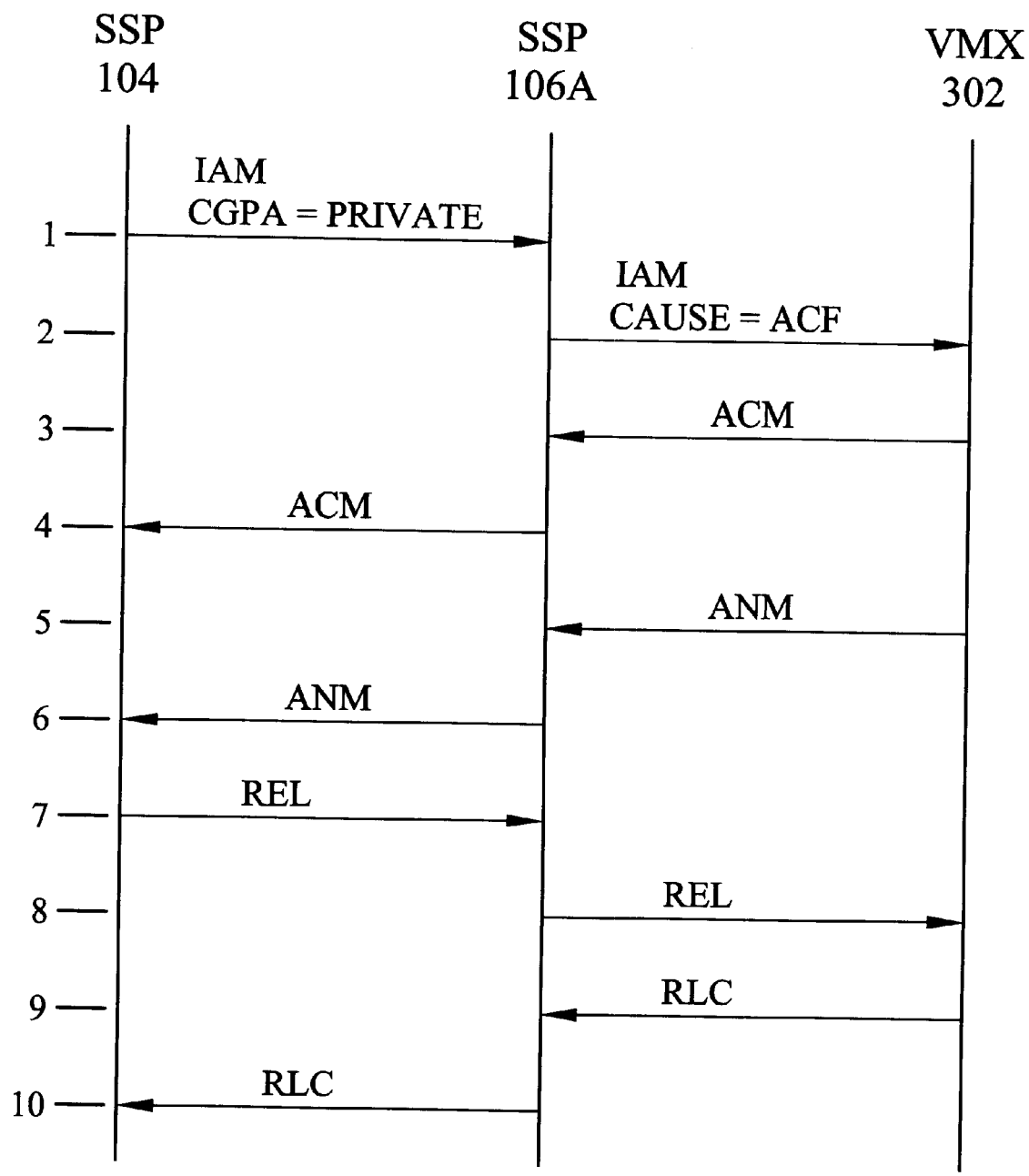
FIG. 4 is a call flow diagram illustrating exemplary call signaling for anonymous and unknown call forwarding according to an embodiment of the present invention.

FIG. 4 is a call flow diagram illustrating exemplary call signaling between SSP 104, SSP 106A, and voice mail system (VMX) 302 for processing anonymous and unknown calls according to an embodiment of the present invention. In line 1 of the call flow diagram, SSP 104 sends an IAM message to SSP 106A. The IAM message includes a calling party address marked as private. In response to receiving the IAM message, SSP 106A performs a lookup in its line options database to determine the options for processing the call to the called party. In this example, a new option is introduced, referred to as the anonymous call forwarding (ACF) option. This option can be evinced by the presence of an anonymous call forwarding indicator stored in the record corresponding to the called party in line options database. In response to locating the anonymous call forwarding option, rather than playing an announcement and terminating the call, in line 2 of the call flow diagram, SSP 106A forwards the IAM message to a predetermined destination, such as voice mail system 302. The forwarded IAM message includes a cause indicator that indicates that the call is an anonymous call that has been forwarded. The IAM message also includes redirection information, such as the original called party number, to enable voice mail system 302 to locate the message for the called party.

In response to receiving the IAM message, in line 3 of the call flow diagram, voice mail system 302 sends an address complete message (ACM) to SSP 106A. In line 4 of the call flow diagram, SSP 106A forwards the ACM message to SSP 104. When voice mail system 302 answers the call, in line 5 of the call flow diagram, voice mail system 302 sends an answer message (ANM) to SSP 106A. In line 6 of the call flow diagram, SSP 106A forwards the ANM message to SSP 104.

Once the ANM message is received by SSP 104, a connection is established between VMX 302 and SSP 104. When the connection is established, voice mail system 302 first plays an announcement to the calling end user 100. Because the announcement is delivered by voice mail system 302 rather than an end office switch, the announcement can be customized by the called party. For example, the called party might record an announcement such as, "this destination does not accept anonymous calls. However, if you would like to leave a message, please do so at the tone." After playing the announcement, voice mail system 302 can allow the called party to record a message.

Once the calling party records the message, the calling party can go on-hook. When the calling party goes on-hook, in line 7 of the call flow diagram, SSP 104 sends a release (REL) message to SSP 106A. In line 8 of the call flow diagram, SSP 106A forwards the REL message to voice mail system 302. In line 9 of the call flow diagram, voice mail system 302 sends a release complete (RLC) message to SSP 106A. In line 10 of the call flow diagram, SSP 106A forwards the RLC message to SSP 104. Thus, in contrast with the conventional call signaling illustrated in FIG. 3, the anonymous call forwarding system according to the present embodiment allows an anonymous or unknown caller to perform some useful action, such as leaving a voice mail message without requiring the anonymous caller to hang up, unblock his or her number, and attempt to reestablish a call.

The present invention is not limited to forwarding calls from anonymous and unknown callers to a voice mail system. For example, in an alternative embodiment, anonymous and unknown calls can be forwarded to any predetermined destination, such as the directory number of a receptionist. In yet another embodiment, anonymous and unknown calls can be forwarded to a directory number of a uniform call distribution group or to an automatic call distribution number.

Figure 5:
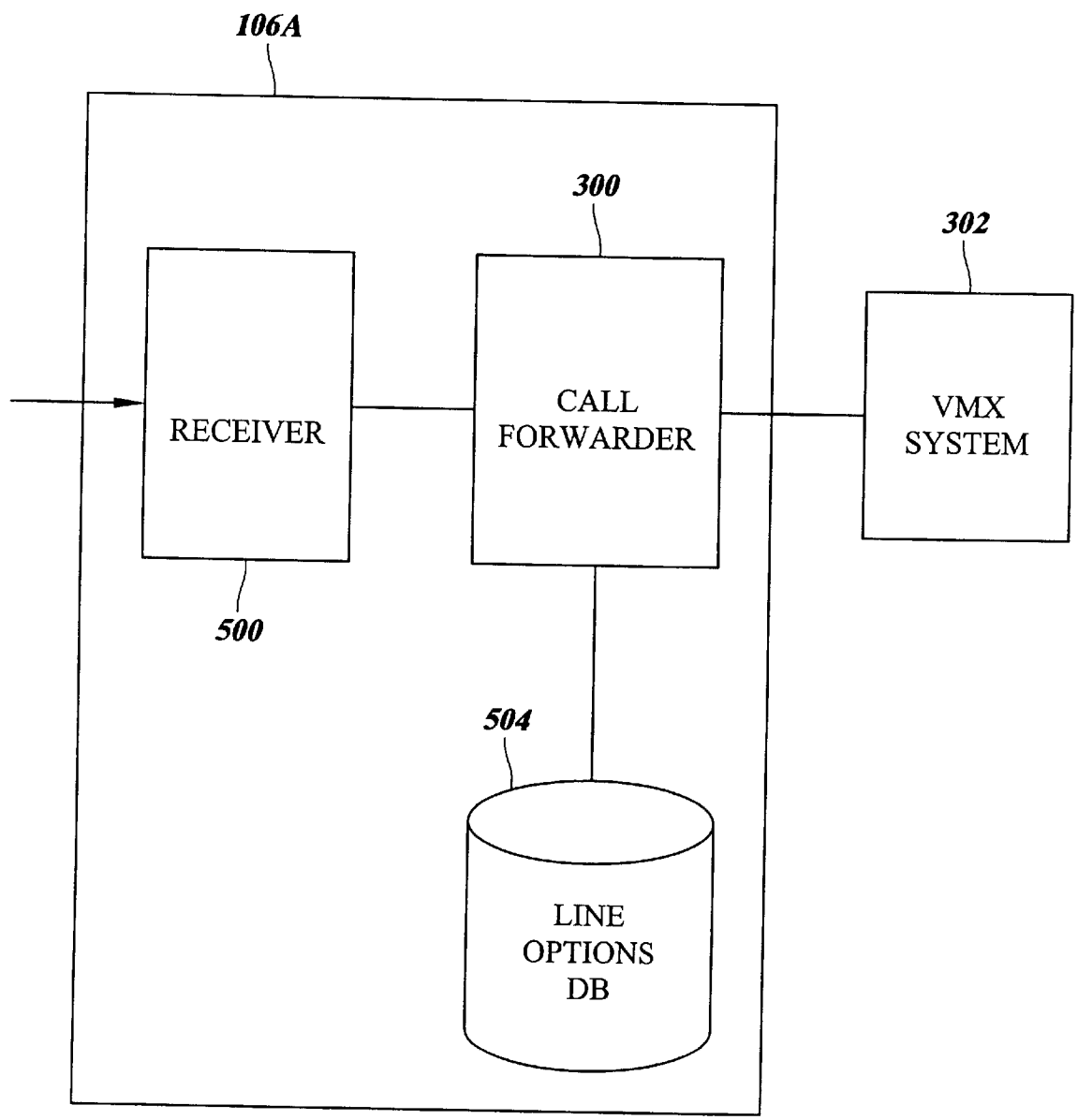
FIG. 5 is a block diagram illustrating a system for processing anonymous and unknown calls according to an embodiment of the present invention.

FIG. 5 is a block diagram of an anonymous and unknown call processing system according to an embodiment of the present invention. In FIG. 5, SSP 106A includes receiver 500 for receiving incoming call signaling messages. Receiver 500 can be a process that performs SS7 layer 1 and 2 processing on incoming call signaling messages and buffers the messages to be processed by other entities. Call forwarder 300 accesses messages received by receiver 500 and determines whether the messages are from anonymous or unknown callers. Call forwarder 300 also accesses line options database 504 to determine whether the called party has the anonymous call forwarding feature. Line options database 504 stores records indexed according to called party addresses. The records contain options for calling parties connected to SSP 106A. Finally, call forwarder 300 communicates with voice mail system (VMX) 302 or other outside entity to forward calls, if the ACF feature is available.

Figure 6:
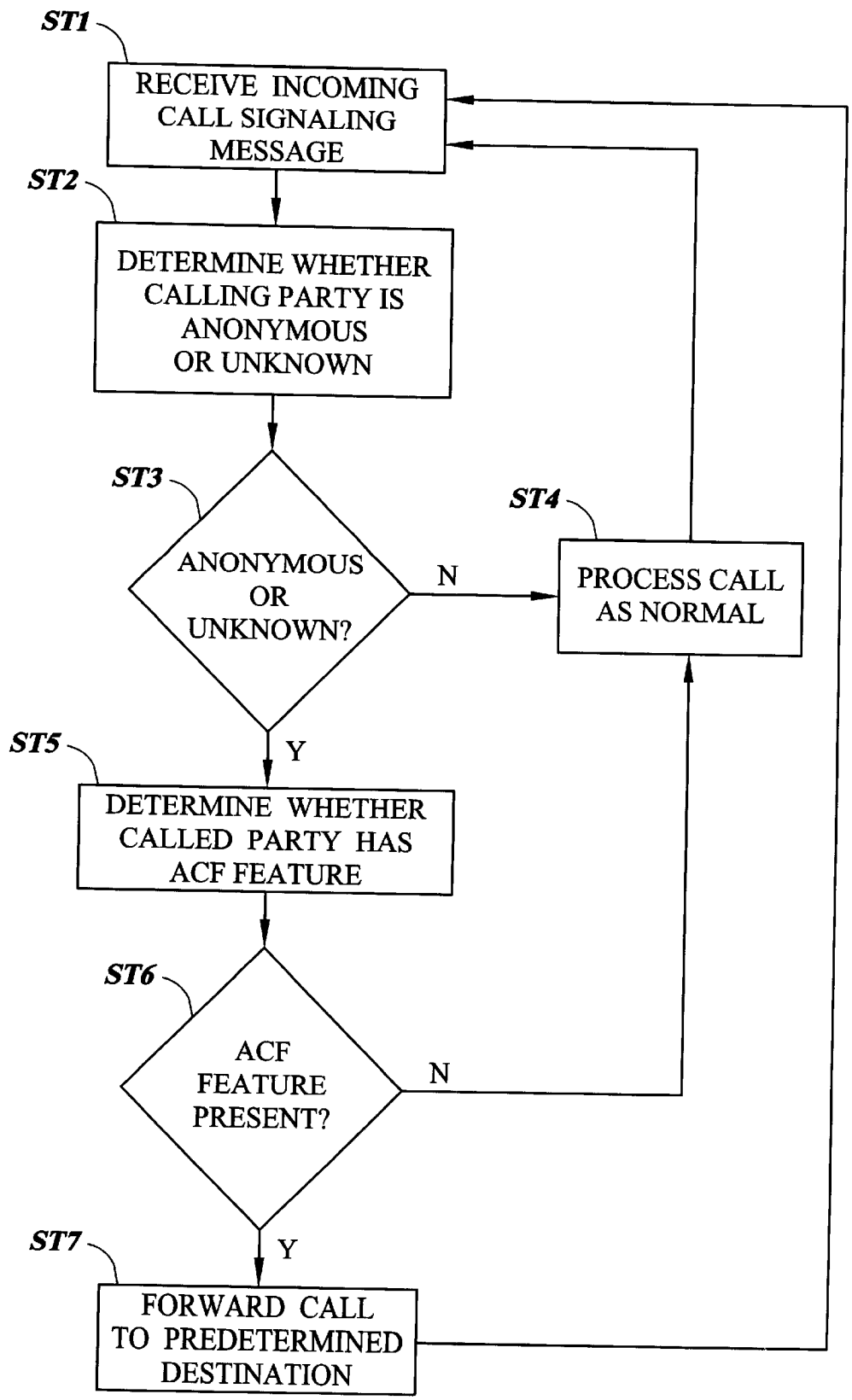
FIG. 6 is a flow chart illustrating exemplary steps that can be performed by call forwarder 300 illustrated in FIG. 5 in processing anonymous and unknown calls according to an embodiment of the present invention.

FIG. 6 is a flow chart illustrating exemplary steps that can be performed by call forwarder 300 illustrated in FIG. 5. In step ST1 of the flow chart, call forwarder 300 receives an incoming call signaling message. For example, receiver 500 illustrated in FIG. 5 can notify call forwarder 300 of an incoming call signaling message. In step ST2, call forwarder 300 determines whether the calling party is anonymous or unknown. In step ST3, if call forwarder 300 determines that the calling party is not anonymous or unknown, in step ST4, call forwarder 300 processes the call as normal. For example, call forwarder 300 can access line options database 504 to determine the options available for the called party and process the call in accordance with those options.

In step ST3, if call forwarder 300 determines that the calling party is anonymous or unknown, in step ST5, call forwarder 300 determines whether the called party has the anonymous call forwarding feature. Determining whether the called party has the anonymous call forwarding feature can include accessing the line options database using the called party address, locating a record corresponding to the called party address, and reading features associated with that record. The presence of an anonymous call forwarding feature can be evinced by the presence of an ACF indicator in the line options database. In step ST6, if call forwarder 300 determines that the ACF feature is present, in step ST7, call forwarder 300 forwards the call to a predetermined destination. Forwarding the call to a predetermined destination includes sending a call signaling message, such as an IAM message, to the destination with a new reason code indicating anonymous or unknown call forwarding. The call signaling message also includes a redirection indicator including the original called party directory number from which the call was forwarded. In step ST6, if call forwarder 300 determines that the ACF feature is not present, call forwarder 300 processes the call as normal.

As illustrated in FIGS. 5 and 6, call forwarder 300 increases the flexibility for processing anonymous and unknown calls. Rather than terminating the calls, call forwarder 300 allows calls to be forwarded to any destination, such as a voice mail system, an operator, or other desirable destination. Forwarding anonymous and unknown calls to a voice mail system increases user flexibility in processing anonymous and unknown calls. For example, voice mail system 302 can include new software for prioritizing anonymous and unknown calls, counting the number of anonymous and unknown calls, providing personalized rejection messages for anonymous and unknown calls, or erasing anonymous and unknown calls. Voice mail system software must also be provisioned to recognize the new anonymous call forwarding reason code received from the called party end office.

Selective Call Acceptance and Rejection

According to another embodiment, the present invention includes methods and systems for performing selective call acceptance and rejection. For example, in conventional selective call acceptance and rejection systems, processing is similar to that illustrated in FIG. 2 where calls are either completed or terminated based on the calling party address. For example, if a called party has a selective call acceptance feature, the calling party address in an incoming call signaling message is compared to a predetermined list of addresses from which the called party desires to accept calls. If the incoming call is not on the list, the call is released. As with anonymous call rejection, the called party SSP can cause a message to be played to the calling party.

Similarly, with selective call rejection, the calling party address in an incoming call signaling message is compared with a predetermined list of addresses from which the called party desires not to accept calls. If the address is on the list, the called party SSP plays a default announcement and terminates the call. Thus, conventional selective call acceptance and rejection require call termination when a call is rejected. According to the present embodiment, calls from rejected parties can be automatically forwarded to a predetermined destination, rather than being terminated.

Figure 7:
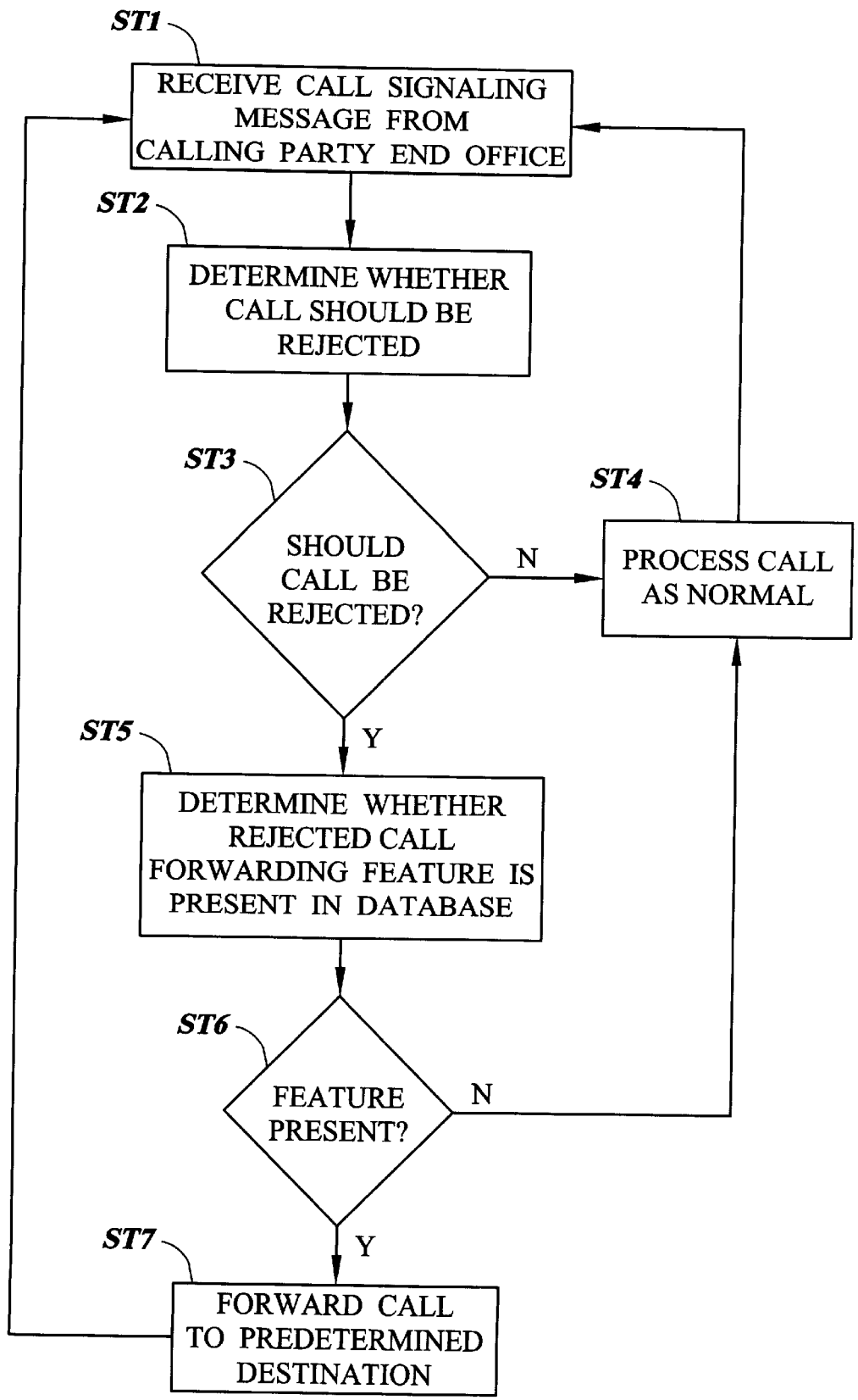
FIG. 7 is a flow chart illustrating exemplary steps that can be performed by call forwarder 300 illustrated in FIG. 5 in performing selective call acceptance and selective call rejection functions according to an embodiment of the present invention.

FIG. 7 is a flow chart illustrating exemplary steps that can be performed by call forwarder 300 illustrated in FIG. 5 to perform selective call acceptance and selective call rejection forwarding functions according to an embodiment of the present invention. In step ST1, call forwarder 300 receives a call signaling message relating to a new call from a calling party end office. For example, the call signaling message can be an IAM message. In step ST2, call forwarder 300 determines whether the call should be accepted or rejected. In order to make this determination, call forwarder 300 can access line options database 504 to determine whether the called party is accepting or rejecting calls from predetermined sources. If an acceptance or rejection list is present in the line options database, in step ST3, call forwarder 300 determines whether the call should be rejected by comparing the calling party address to the list. In step ST4, if call forwarder 300 determines that the call should not be rejected, i.e. because the number is either on the accepted list or absent from the rejection list, the call is processed as normal.

In step ST5, if call forwarder 300 determines that the call should be rejected, call forwarder 300 determines whether the called party has a rejected call forwarding feature. As with the anonymous call forwarding feature, the presence of the rejected call forwarding feature can be evinced by the presence of a rejected call forwarding indicator in the line options database. In step ST6 if call forwarder 300 determines that such a feature is not present, the call is processed as normal. In other words, call forwarder 300 functions similarly to the conventional case described above where the call is released. However, in step ST6, if rejected call forwarding feature is present in the database, in step ST7, call forwarder 300 forwards the call to a predetermined destination. Forwarding the call to a predetermined destination includes sending a message to the destination with a cause code that indicates selective call acceptance forwarding or selective call rejection forwarding. If the final destination is a voice mail system, the message can also include a redirection indicator that indicates the number that forwarded the call. In this case, the number would be the number of the called party. The redirection indicator in combination with the cause code can be used to play an appropriate message to the calling party, such as, "the party you are attempting to reach is unavailable. Please leave a message at the tone." Thus, rather than terminating a call from a rejected party, the call forwarder according to the present embodiment forwards the call to a predetermined destination, such as a voice mail system, an attendant, or other suitable destination.

It will be understood that various details of the invention can be changed without departing from the scope of the invention. Furthermore, the foregoing description is for the purpose of illustration only, and not for the purpose of limitation-the invention being defined by the claims.

What is claimed is:

1. A method for processing anonymous or unknown calls, the method comprising:
   (a) at an end office serving a called party, receiving a first call signaling message relating to a first call from an end office serving a calling party;
   (b) determining whether the first call is anonymous or unknown based on the first call signaling message;
   (c) in response to determining that the first call is anonymous or unknown, determining whether the called party has an anonymous or unknown call forwarding feature; and
   (d) in response to determining that the called party has an anonymous or unknown call forwarding feature, forwarding the first call to a predetermined destination.

2. The method of claim 1 wherein forwarding the first call to a predetermined destination includes forwarding the first call to a voice mail system.

3. The method of claim 2 wherein forwarding the first call to a voice mail system includes sending a simplified message desk interface (SMDI) message to the voice mail system.

4. The method of claim 3 wherein sending an SMDI message to the voice mail system includes sending an SMDI message including a redirection indicator for storing a called party number and a reason code indicative of the anonymous call forwarding feature.

5. The method of claim 2 wherein forwarding the first call to a voice mail system includes sending an SS7 message to the voice mail system.

6. The method of claim 5 wherein sending an SS7 message to the voice mail system includes sending an initial address message (IAM) to the voice mail system.

7. The method of claim 6 wherein the IAM message includes a redirection indicator indicative of a called party number and a reason code indicative of the anonymous call forwarding feature.

8. The method of claim 1 wherein determining whether the first call is anonymous or unknown based on the first call signaling message includes examining a calling party address parameter in the first call signaling message.

9. The method of claim 1 wherein determining whether the called party has an anonymous or unknown call forwarding feature includes performing a search for a record corresponding to the called party in a line options database, locating the record, and determining whether the record contains an anonymous or unknown call forwarding indicator.

10. A method for processing calls comprising:
    (a) at an end office serving a called party, receiving a call signaling message relating to a call from an end office serving a calling party;
    (b) determining whether the call should be rejected based on a calling party address in the call signaling message and at least one of a predetermined accepted calling party address list and a predetermined rejected calling party address list;
    (c) in response to determining that the call should be rejected, determining whether the called party has a rejected call forwarding feature; and
    (d) in response to determining the called party has a rejected call forwarding feature, forwarding the call to a predetermined destination.

11. The method of claim 10 wherein forwarding the call to a predetermined destination includes forwarding the call to a voice mail system.

12. The method of claim 11 wherein forwarding the call to a voice mail system includes sending a simplified message desk interface (SMDI) message to the voice mail system.

13. The method of claim 12 wherein sending an SMDI message to the voice mail system includes sending an SMDI message including a redirection indicator for storing a called party number and a reason code indicative of the rejected call forwarding feature.

14. The method of claim 12 wherein forwarding the call to a voice mail system includes sending an SS7 message to the voice mail system.

15. The method of claim 14 wherein sending an SS7 message to the voice mail system includes sending an initial address message (IAM) to the voice mail system.

16. The method of claim 15 wherein the IAM message includes a redirection indicator indicative of a called party number and a reason parameter indicative of the rejected call forwarding feature.

17. The method of claim 10 wherein determining whether the called party has a rejected call forwarding feature includes performing a search for a record corresponding to the called party in a line options database, locating the record, and determining whether the record includes rejected call forwarding indicator.

18. A system for processing calls, the system comprising:
    (a) a receiver operatively associated with an end office serving a called party for receiving a call signaling message from an end office serving a calling party;
    (b) a line options database for storing line options for the called party, the line options for the called party including an anonymous call forwarding indicator; and
    (c) a call forwarder for analyzing the call signaling message received by the receiver to determine whether the call is anonymous, and in response to determining that the call is anonymous, accessing the line options database to determine whether the anonymous call forwarding indicator is present.

19. The system of claim 18 wherein the call forwarder is adapted to forward the call to a predetermined destination in response to locating the anonymous call forwarding indicator in the line options database.

20. The system of claim 19 comprising a voice mail system operatively associated with the call forwarder, wherein the call forwarder is adapted to forward the call to the voice mail system in response to locating the anonymous call forwarding indicator in the line options database.

21. The system of claim 20 wherein the call forwarder is adapted to send a simplified message desk interface (SMDI) message to the voice mail system.

22. The system of claim 20 wherein the call forwarder is adapted to send an SS7 message to the voice mail system.

23. A computer program product comprising computer-executable instructions embodied in a computer-readable medium for performing steps comprising:
   (a) at an end office serving a called party, receiving a first call signaling message relating to a first call from an end office serving a calling party;
   (b) determining whether the first call is anonymous or unknown based on the first call signaling message;
   (c) in response to determining that the first call is anonymous or unknown, determining whether the called party has an anonymous or unknown call forwarding feature; and
   (d) in response to determining that the called party has an anonymous or unknown call forwarding feature, forwarding the call to a predetermined destination.

24. The computer program product of claim 23 wherein forwarding the first call to a predetermined destination includes forwarding the first call to a voice mail system.

25. The computer program product of claim 24 wherein forwarding the first call to a voice mail system includes sending a simplified message desk interface (SMDI) message to the voice mail system.

26. The computer program product of claim 25 wherein sending an SMDI message to the voice mail system includes sending an SMDI message including a redirection indicator for storing a called party number and a reason code indicative of the anonymous call forwarding feature.

27. The computer program product of claim 24 wherein forwarding the first call to a voice mail system includes sending an SS7 message to the voice mail system.

28. The computer program product of claim 27 wherein sending an SS7 message to the voice mail system includes sending an initial address message (IAM) to the voice mail system.

29. The computer program product of claim 28 wherein the IAM message includes a redirection indicator indicative of a called party number and a reason code indicative of the anonymous call forwarding feature.

30. The computer program product of claim 23 wherein determining whether the first call is anonymous or unknown based on the first call signaling message includes examining a calling party address parameter in the first call signaling message.

31. The computer program product of claim 23 wherein determining whether the called party has an anonymous or unknown call forwarding feature includes performing a search for a record corresponding to the called party in a line options database, locating the record, and determining whether the record contains an anonymous call forwarding indicator.

32. A computer program product comprising computer-executable instructions embodied in a computer-readable medium for performing steps comprising:
   (a) at an end office serving a called party, receiving a call signaling message relating to a call from an end office serving a calling party;
   (b) determining whether the call should be rejected based on a calling party address in the call signaling message and at least one of a predetermined accepted calling party address list and a predetermined rejected calling party address list;
   (c) in response to determining that the call should be rejected, determining whether the called party has a rejected call forwarding feature; and
   (d) in response to determining the called party has a rejected call forwarding feature, forwarding the call to a predetermined destination.

33. The computer program product of claim 32 wherein forwarding the call to a predetermined destination includes forwarding the call to a voice mail system.

34. The computer program product of claim 33 wherein forwarding the call to a voice mail system includes sending a simplified message desk interface (SMDI) message to the voice mail system.

35. The computer program product of claim 34 wherein sending an SMDI message to the voice mail system includes sending an SMDI message including a redirection indicator for storing a called party number and a reason code indicative of the rejected call forwarding feature.

36. The computer program product of claim 33 wherein forwarding the call to a voice mail system includes sending an SS7 message to the voice mail system.

37. The computer program product of claim 36 wherein sending an SS7 message to the voice mail system includes sending an initial address message (IAM) to the voice mail system.

38. The computer program product of claim 37 wherein the IAM message includes a redirection indicator indicative of a called party number and a reason parameter indicative of the rejected call forwarding feature.

* * * * *